No. 737,036. PATENTED AUG. 25, 1903.
J. STANICEK.
HORSE HOLDER.
APPLICATION FILED JULY 9, 1903.
NO MODEL. 2 SHEETS—SHEET 1.

Witnesses:
Ray White.
Harry R. L. White.

Inventor:
Joseph Stanicek.

By Morgan & Brimster, Atty.

THE NORRIS PETERS CO., PHOTO-LITHO., WASHINGTON, D. C.

No. 737,036. PATENTED AUG. 25, 1903.
J. STANICEK.
HORSE HOLDER.
APPLICATION FILED JULY 9, 1903.
NO MODEL. 2 SHEETS—SHEET 2.
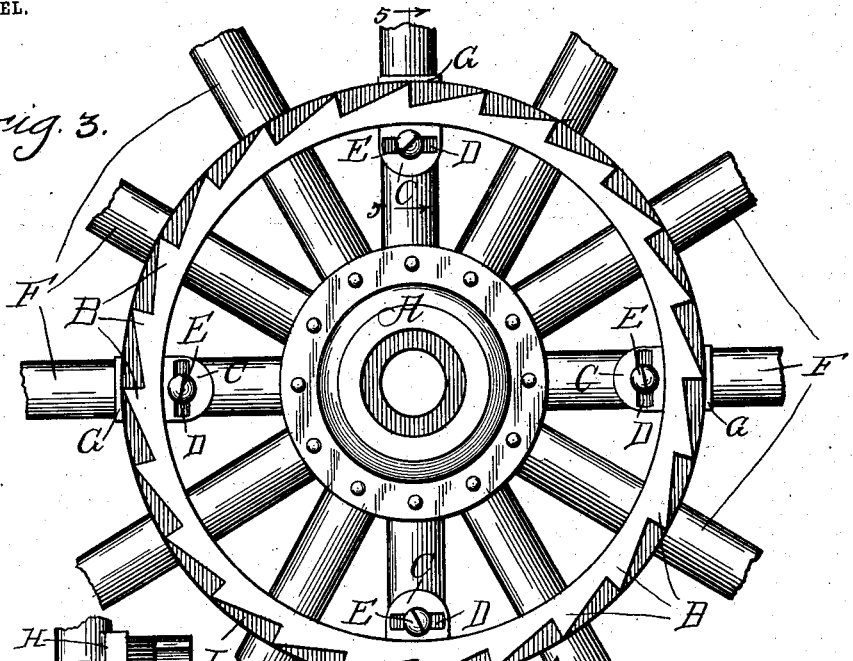
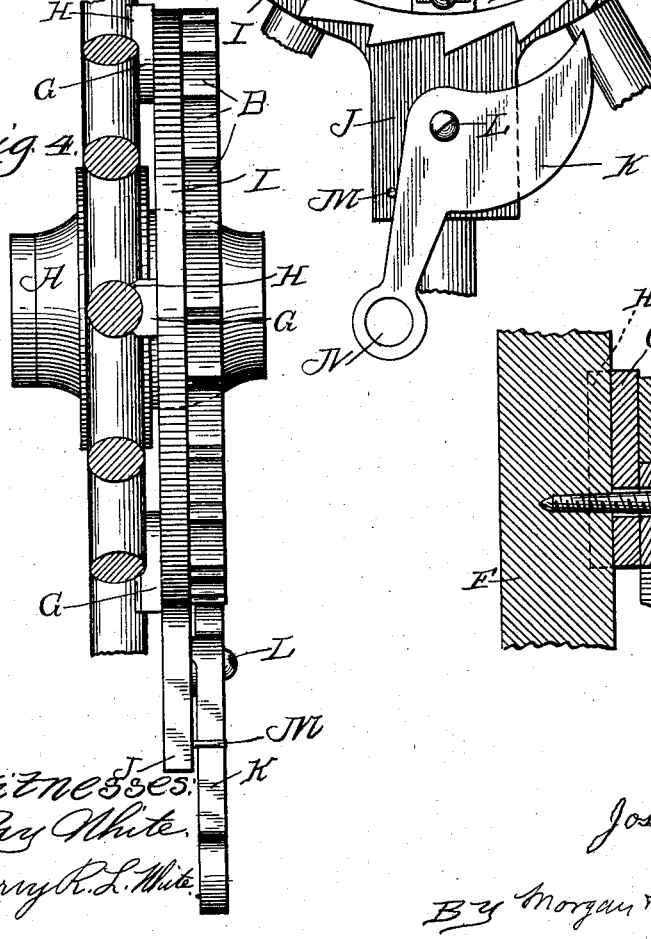
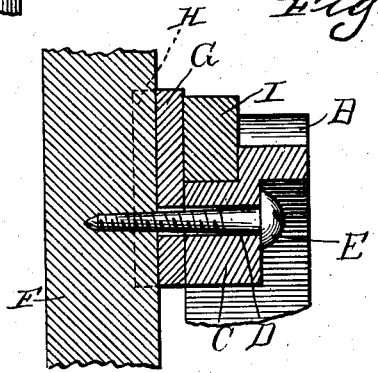
Witnesses
Ray White
Harry R. L. White
Inventor:
Joseph Stanicek.
By Morgan & Brinster, Attys.

No. 737,036.                                              Patented August 25, 1903.

UNITED STATES PATENT OFFICE.

JOSEPH STANICEK, OF CHICAGO, ILLINOIS.

HORSE-HOLDER.

SPECIFICATION forming part of Letters Patent No. 737,036, dated August 25, 1903.

Application filed July 9, 1903. Serial No. 164,883. (No model.)

*To all whom it may concern:*

Be it known that I, JOSEPH STANICEK, a citizen of the United States, whose residence and post-office address is at No. 1354 Turner avenue, in the city of Chicago, in the county of Cook and State of Illinois, have invented a new and useful Improvement in Horse-Holders, of which the following is a specification.

The object of my invention is to dispense with the heavy weight generally used on the end of the hitching-strap, which is lifted in and out of the vehicle for the purpose of holding the horse when temporary stops are made and which is not effective in holding the horse safely, and to provide an absolutely secure holder which can be instantly and easily attached and adjusted to the horse.

The manner in which I accomplish my object is shown in the following exact description, reference being had to the accompanying drawings, in which—

Figure 1:
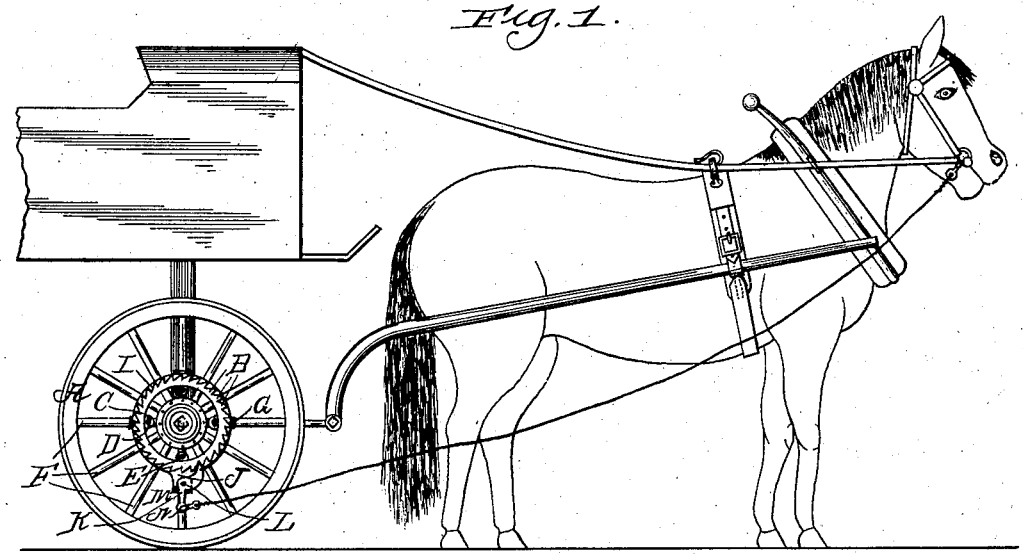
Figure 2:
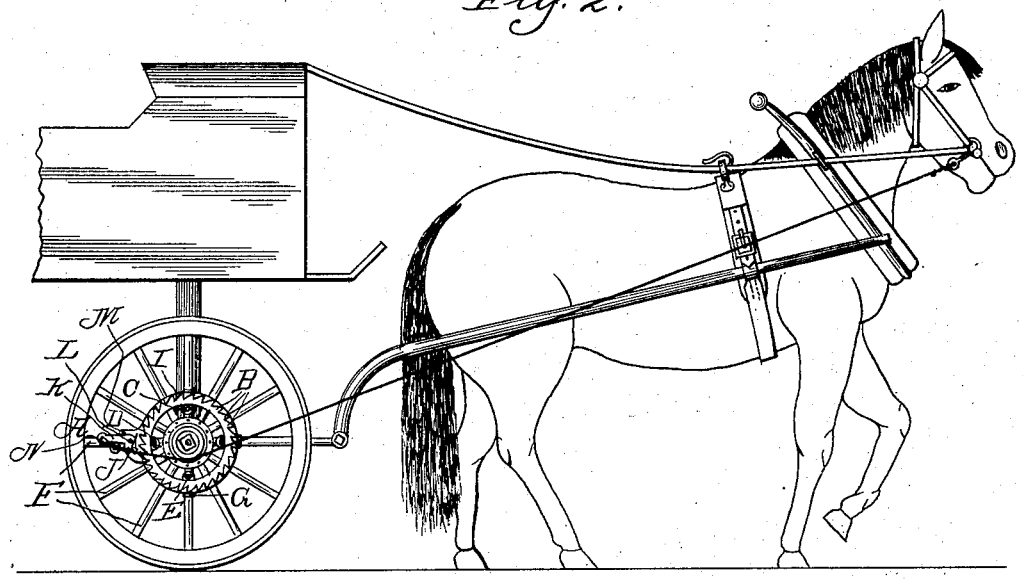

Figure 1 shows my device on the front right-side wheel and attached to the bridle on the horse. Fig. 2 is a similar view showing the forward movement of the horse and the tightening of the line connecting the bridle and my device, said device having partly revolved with the forward movement of the wheel. Fig. 3 is an enlarged view of the device in the position shown in Figs. 1 and 2. Fig. 4 is a perspective view looking in the direction of the arrows on the line 5 5, Fig. 3. Fig. 5 is a sectional view through the line 5 Fig. 3.

Similar letters indicate the same parts in the several views.

The wheel A may be of any size and preferably the front right wheel. Attached to this wheel is a ratchet-wheel B, having two or more ears C, in which there are oblong apertures D, through which the wood-screws E are free to pass into the spokes F of the wheel A, thereby securing the adjustment and firm attachment of the ratchet-wheel to the wheel A. Between the ears C and the spokes F are gripping-blocks G, which are grooved, as shown at H, Fig. 4, to fit the curve of the spokes. Between the ratchet-wheel and the gripping-blocks G is a ring I, having an arm J. To this arm a pawl K is pivotally attached by the pivotal tap-screw L. This ring is loosely fitted on the ratchet-wheel, so that the weight of the arm J and pawl K holds it stationary and the arm pendent while the ratchet-wheel revolves with the wheel A and the arm of the pawl rests against the stop-pin M. When the horse is to be held, the hitching-strap or line is hooked at one end into the pawl-ring N and to the bridle, as shown in Fig. 1. The weight and the adjustment of the hitching-strap and hooks brings the pawl into engagement with the ratchet-wheel, so that any forward movement of the horse which revolves the wheel A carries the pawl around with the ratchet-wheel, as shown in Fig. 2, and draws upon the bridle, thereby checking the horse and causing him to back up till the pull on the bridle ceases by the return of the pawl to the position shown in Fig. 1. The horse may back without interference, as the pawl will not interfere with the movement in that direction.

What I claim as new, and desire to secure by Letters Patent, is—

The combination with the wheel of a vehicle of a ratchet-wheel securely attached thereto and supporting a loose ring, and a pawl pivotally attached to said loose ring, and a hitching strap or line having suitable fastening connecting said pawl and the horse's bridle, substantially as described and for the purposes specified.

JOSEPH STANICEK.

Witnesses:
JULIUS RUBINSTEIN,
JOSEPH STAAB.